Aug. 18, 1942.  D. W. HUDSON  2,293,650
TIRE CHAIN TOOL
Filed April 14, 1941
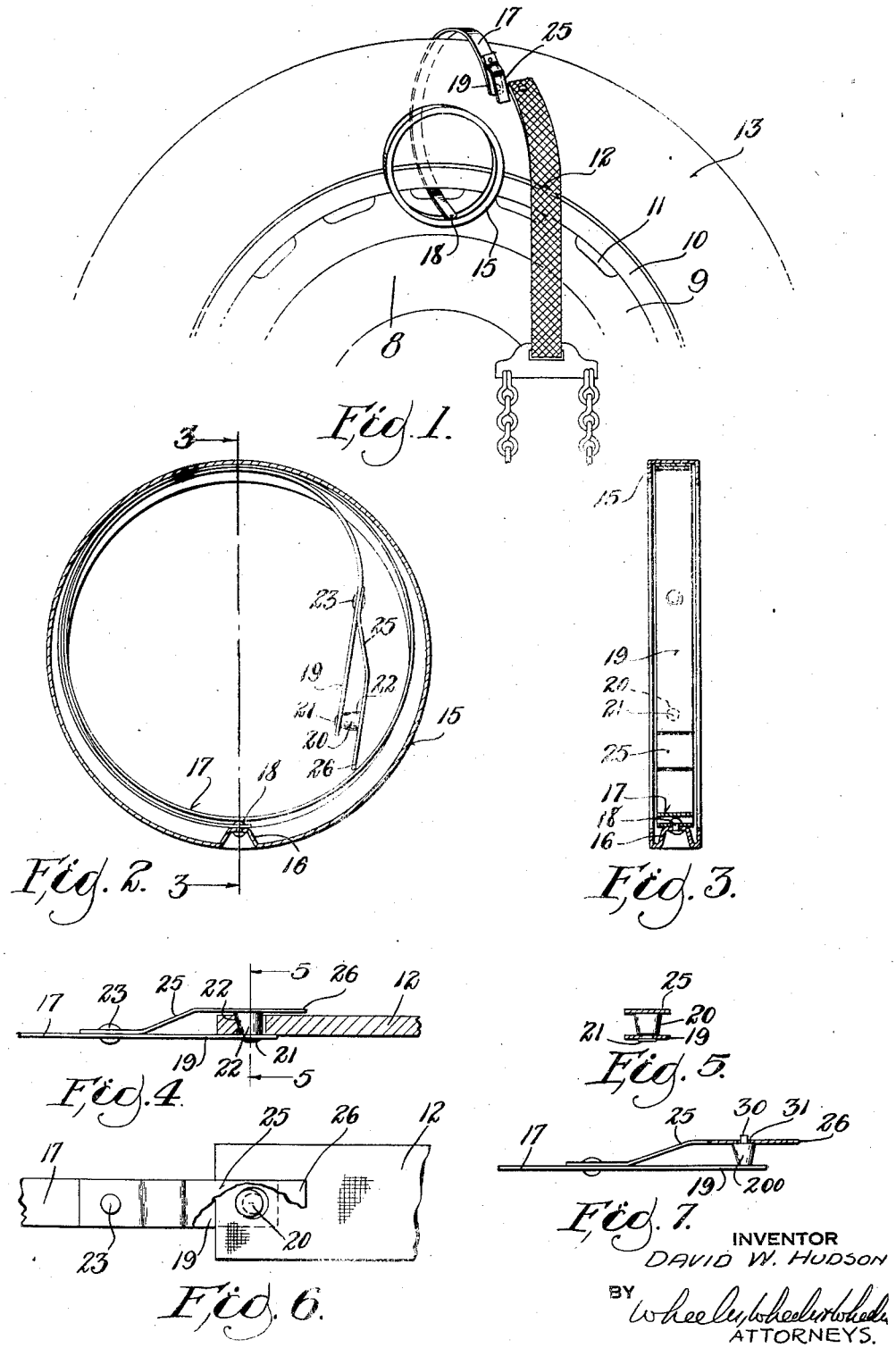
INVENTOR
DAVID W. HUDSON
BY
Wheeler, Wheeler & Wheeler
ATTORNEYS.

Patented Aug. 18, 1942

2,293,650

UNITED STATES PATENT OFFICE 2,293,650

TIRE CHAIN TOOL

David W. Hudson, Green Bay, Wis., assignor to Alden Hudson, Green Bay, Wis.

Application April 14, 1941, Serial No. 388,376

5 Claims. (Cl. 24—201)

This invention relates to improvements in tools for applying tire chains to the wheels of motor vehicles. The present application is a companion to my application Serial No. 125,692 filed February 15, 1937.

In modern automotive practice the clearance between the felloe and the rim of an automobile wheel is extremely limited, barely exceeding the thickness of the tire chain strap which must be drawn therethrough in the application of tire chains to the wheel. It is the primary object of the present invention to provide means which will securely and adequately engage a tire chain strap without producing, in combination with the strap, a combined thickness too great to pass through the available space. Since the tension required to draw the chain about the wheel is sometimes considerable, it is my object to produce a device that, while light, will nevertheless be sufficiently strong to satisfy all demands made upon it without any possibility of releasing the tire chain strap.

Other objects will be apparent to those skilled in the art upon analysis of the following disclosure of the invention.

In the drawing:

Fig. 1 is a view in side elevation diagrammatically illustrating my improved tool in position for engagement with a tire chain strap for pulling the strap about an automobile tire and rim.

Fig. 2 is an enlarged detail view of my improved implement as it appears in transverse section when nested for storage.

Fig. 3 is a view in cross section taken on line 3—3 of Fig. 2.

Fig. 4 is an enlarged detail view of the improved grip at the end of the tool as it appears in side elevation and in engagement with a tire chain strap, the latter being illustrated in section.

Fig. 5 is a view of the grip in cross section taken on line 5—5 of Fig. 4.

Fig. 6 is a view in plan, partially broken away, showing the grip.

Fig. 7 is a view similar to Fig. 4 showing a modified embodiment of the invention.

Like parts are identified by the same reference characters throughout the several views.

The wheel 8 has a felloe portion 9 engaging a rim 10. At intervals the felloe is peripherally notched at 11, providing a space with limited clearance through which the operator is able to introduce the tire chain strap 12.

For the convenient manipulation of the tire chain strap about the tire 13 and through one of the openings at 11, I have disclosed in the companion application above identified, a tool which comprises a handle 15 which is channel-shaped in cross section and provided at 16 with a boss to which a spring steel tape or strap 17 is pivotally held by rivet 18. The boss elevates the inner end of the thin steel strap 17 above the sides of the channel so that the strap may be swung out of the channel to either side. Normally the strap will be stored within the channeled handle in a coil as shown in Figs. 2 and 3. When it is desired to use the tool the strap may be swung laterally about its pivotal connection with the handle to the position in which it is illustrated in Fig. 1, and may thereupon be introduced into one of the openings 11 and so manipulated that its free end will follow the curvature of the tire and ultimately will appear about the tire at the outer periphery thereof so that the tire chain strap 12 may be fastened to its terminal connector to be pulled or threaded about the tire and through the aperture 11 into which the tool is initially introduced.

It is with the connector at the end of the spring steel tape 17 that the present application is particularly concerned. In accordance with the present inventon the terminal end portion 19 of the spring steel tape is provided at 20 with a post which may be riveted thereto at 21 and preferably expands as it leaves the tape. As shown in Fig. 5, the outer end of the post is materially wider than its inner end. As shown in Fig. 4, the post is beveled at least rearwardly at 22 so as to tend to draw the tire chain strap 12 downwardly onto the post and against the spring tape 19.

Riveted to the spring steel tape 17 at 23, is a spring steel keeper 25 which lies across the top of the post 20 in substantial parallelism with the extremity 19 of the tape 17. The keeper is preferably materially longer than the tape projecting therebeyond at 26 (Fig. 4). It is so biased in its construction that it engages the end of the post with considerable pressure. Thus, the keeper, as well as the taper of the post at 22, serves to hold the tire chain strap 12 on the post during the use of the tool, the end of the strap being apertured as shown to receive the post.

The projecting portion 26 of the keeper facilitates manipulation of the strap onto and off of the post. The strap 12 may itself be engaged with the end portion 26 of the keeper to force the keeper aside sufficiently to permit the introduction of the strap to a position where the post may be engaged in its orifice. Similarly, when it is desired to uncouple the tire chain strap from the tool, the pressure of the strap 12 upwardly upon the projecting end portion 26 of the keeper will readily spring the keeper aside sufficiently to permit the strap to emerge between the keeper and the post. However, except when the parts are manipulated angularly in this manner, the engagement of the connector with the tire chain strap is extremely tight and it is therefore secure against accidental release.

Where it is necessary to provide for the transmission of unusual tension the post may be provided with a projection pin 30 such as is shown extending from the top of the post 200 in the construction illustrated in Fig. 7. Where such a pin is employed, the keeper 25 is apertured at 31 so that the pin 30 projects through the aperture. Any such thrust as might be exerted outwardly upon the post 200 in the Fig. 7 construction is sustained not merely by the riveted connection of the post with the steel tape 19, but is also sustained by the engagement of the pin 30 with the keeper 25, thus providing additional security against deformation of the device or breakage thereof where the tensions encountered are extreme.

I claim:

1. In a tool for drawing an apertured tire chain web about a tire, the combination with a band constituting the tool, of a post fixed to said band adjacent an end thereof and projecting rigidly and substantially at right angles from the face of the band, and a keeper comprising a spring strap fixed to the band at a point spaced from the post and extending thence away from the band and thence across the end of the post in substantial parallelism to the band and biased toward engagement with the post, whereby to tend to retain on said post an apertured tire chain web engaged therewith.

2. The device of claim 1 in which the keeper has an end portion projecting materially beyond the end of the band and constituting a lever adapted to be engaged by the tire chain web for manipulation of the keeper to pass the web to and from engagement with the post.

3. The device of claim 1 in which the post has an enlarged end at a point remote from the band and tapers in cross section toward the band.

4. The device of claim 1 in which the post has an end portion provided with a pin projecting beyond the post away from the band, said keeper having an aperture in which said pin is engaged.

5. The device of claim 1 in which the keeper has an end portion projecting materially beyond the end of the band and constituting a lever adapted to be engaged by the tire chain web for manipulating the keeper to facilitate the engagement and disengagement of such web respecting said post, the post having a pin materially smaller in cross section than the post projecting outwardly away from the band beyond the end of the post, and the keeper having a corresponding aperture in which said pin is receivable when said keeper is engaged with the end of the post about the pin.

DAVID W. HUDSON.